United States Patent
Tait et al.

(10) Patent No.: US 7,629,421 B2
(45) Date of Patent: Dec. 8, 2009

(54) MONOMER RECOVERY BY RETURNING COLUMN OVERHEAD LIQUID TO THE REACTOR

(75) Inventors: John H. Tait, Stafford, TX (US); Robert S. Murphy, Shanghai (CN); Michael A. Watts, Houston, TX (US); Anurag Gupta, Sugarland, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 735 days.

(21) Appl. No.: 11/313,328

(22) Filed: Dec. 21, 2005

(65) Prior Publication Data

US 2007/0142576 A1  Jun. 21, 2007

(51) Int. Cl.
C08F 6/04 (2006.01)
B01D 3/14 (2006.01)
B01D 5/00 (2006.01)

(52) U.S. Cl. ............................. 526/68; 526/64; 526/70; 526/920; 202/161; 203/81; 203/87

(58) Field of Classification Search ................. 528/501; 202/161; 203/98, 81, 87; 526/64, 68, 70, 526/920
See application file for complete search history.

(56) References Cited

U.S. PATENT DOCUMENTS

| | | |
|---|---|---|
| 3,640,980 A | 2/1972 | Baba |
| 4,424,341 A | 1/1984 | Hanson et al. |
| 4,436,902 A | 3/1984 | Wood et al. |
| 4,439,601 A | 3/1984 | McCurdy et al. |
| 4,448,539 A | 5/1984 | Burgert |
| 4,461,889 A | 7/1984 | Hanson |
| 4,499,263 A | 2/1985 | Messura et al. |
| 4,501,885 A | 2/1985 | Sherk et al. |
| 4,528,337 A | 7/1985 | Kreilein et al. |
| 4,543,399 A | 9/1985 | Jenkins, III et al. |
| 4,589,957 A | 5/1986 | Sherk et al. |
| 4,613,484 A | 9/1986 | Ayres et al. |
| 4,632,976 A | 12/1986 | Asanuma et al. |
| 4,690,804 A | 9/1987 | Rohlfing |
| 4,737,280 A | 4/1988 | Hanson |
| 4,794,151 A | 12/1988 | Mueller-Mall et al. |

(Continued)

FOREIGN PATENT DOCUMENTS

WO  WO 2005/044872 A  5/2005

(Continued)

*Primary Examiner*—Fred M Teskin
(74) *Attorney, Agent, or Firm*—Fletcher Yoder

(57) ABSTRACT

A polyolefin production system, comprising a polymerization reactor (such as a polyethylene loop slurry reactor) and a fractionation system that receives reactor effluent processed in a diluent/monomer recovery system for recycle to the reactor and to suppliers. A conduit diverts a portion of a reflux flow comprising monomer, such as ethylene, from within the fractionation system to the polymerization reactor, providing for less venting of monomer, such as ethylene, to the supplier. Accordingly, monomer yield is advantageously increased, as the monomer returned to the reactor displaces monomer feedstock to the reactor. The reflux flow may originate from a condensed overhead lights from a diluent recycle column disposed in the fractionation subsystem. The diluent recycle column may receive a stream comprising diluent and monomer as feed from the diluent/monomer recovery subsystem, and may receive the non-diverted portion of the reflux flow as reflux.

22 Claims, 4 Drawing Sheets

U.S. PATENT DOCUMENTS

| | | | |
|---|---|---|---|
| 4,832,915 A | 5/1989 | Messura et al. |
| 5,183,866 A | 2/1993 | Hottovy |
| 5,207,929 A | 5/1993 | Sung et al. |
| 5,225,465 A | 7/1993 | Eichenauer et al. |
| 5,252,201 A * | 10/1993 | Sampath | 208/355 |
| 5,272,236 A | 12/1993 | Lai et al. |
| 5,276,115 A | 1/1994 | Bohmer et al. |
| 5,278,272 A | 1/1994 | Lai et al. |
| 5,292,863 A | 3/1994 | Wang |
| 5,314,579 A | 5/1994 | Sung |
| 5,326,835 A | 7/1994 | Ahvenainen et al. |
| 5,371,158 A | 12/1994 | Brekner et al. |
| 5,387,659 A | 2/1995 | Hottovy et al. |
| 5,416,179 A | 5/1995 | Welch et al. |
| 5,455,314 A | 10/1995 | Burns et al. |
| 5,473,020 A | 12/1995 | Peifer et al. |
| 5,480,948 A | 1/1996 | Geerts |
| 5,492,985 A | 2/1996 | Peifer et al. |
| 5,565,174 A | 10/1996 | Burns et al. |
| 5,565,175 A | 10/1996 | Hottovy et al. |
| 5,575,979 A | 11/1996 | Hanson |
| 5,597,892 A | 1/1997 | Hanson |
| 5,638,834 A | 6/1997 | White et al. |
| 5,639,834 A | 6/1997 | Debras et al. |
| 5,712,365 A | 1/1998 | Arai et al. |
| 5,744,555 A | 4/1998 | Ames et al. |
| 5,747,407 A | 5/1998 | Martin |
| 5,898,053 A | 4/1999 | Leaney et al. |
| 5,959,044 A | 9/1999 | Villar |
| 5,986,021 A | 11/1999 | Hokkanen et al. |
| 6,042,790 A | 3/2000 | Hottovy et al. |
| 6,045,661 A | 4/2000 | Kreischer et al. |
| 6,204,344 B1 | 3/2001 | Kendrick et al. |
| 6,225,422 B1 | 5/2001 | Power et al. |
| 6,239,235 B1 | 5/2001 | Hottovy et al. |
| 6,281,300 B1 | 8/2001 | Kendrick |
| 6,319,997 B1 | 11/2001 | Kendrick et al. |
| 6,380,325 B1 | 4/2002 | Kendrick |
| 6,815,511 B2 | 11/2004 | Verser et al. |
| 6,818,186 B2 | 11/2004 | Burns et al. |
| 6,838,531 B2 | 1/2005 | Reid et al. |
| 6,908,971 B2 | 6/2005 | Burns et al. |
| 2001/0012497 A1 | 8/2001 | Debras |
| 2002/0086955 A1 | 7/2002 | Kendrick |
| 2002/0111441 A1 | 8/2002 | Kendrick et al. |
| 2002/0132936 A1 | 9/2002 | Kendrick et al. |
| 2002/0173598 A1 | 11/2002 | Kendrick et al. |
| 2002/0182121 A1 | 12/2002 | Kendrick |
| 2003/0229187 A1 | 12/2003 | Kufeld et al. |
| 2004/0116625 A1 | 6/2004 | Hottovy et al. |
| 2004/0132928 A1 | 7/2004 | Hottovy et al. |
| 2004/0136881 A1 | 7/2004 | Verser et al. |
| 2004/0158007 A1 | 8/2004 | Hottovy et al. |
| 2005/0095176 A1 | 5/2005 | Hottovy |

FOREIGN PATENT DOCUMENTS

| | | | |
|---|---|---|---|
| WO | WO 2006/026493 A | 3/2006 |

* cited by examiner

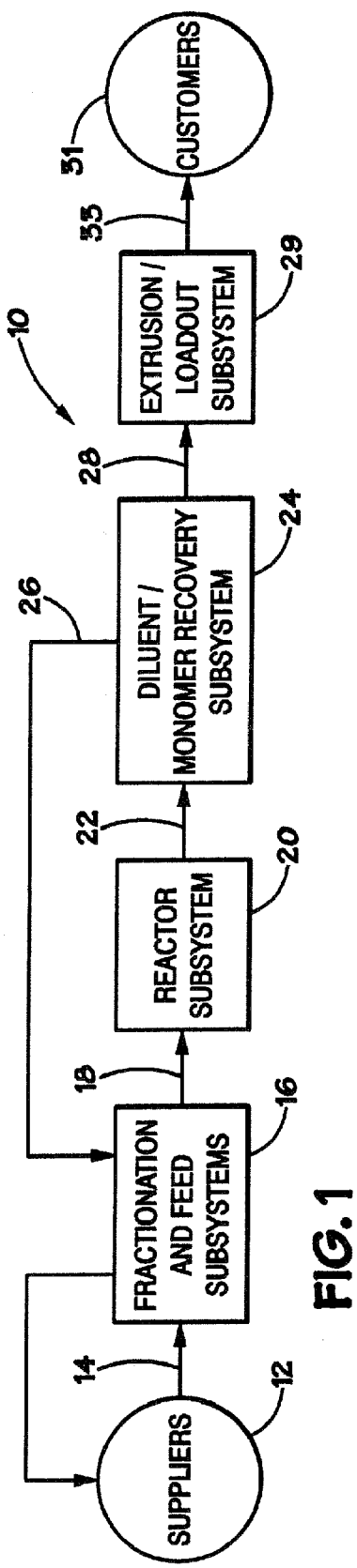
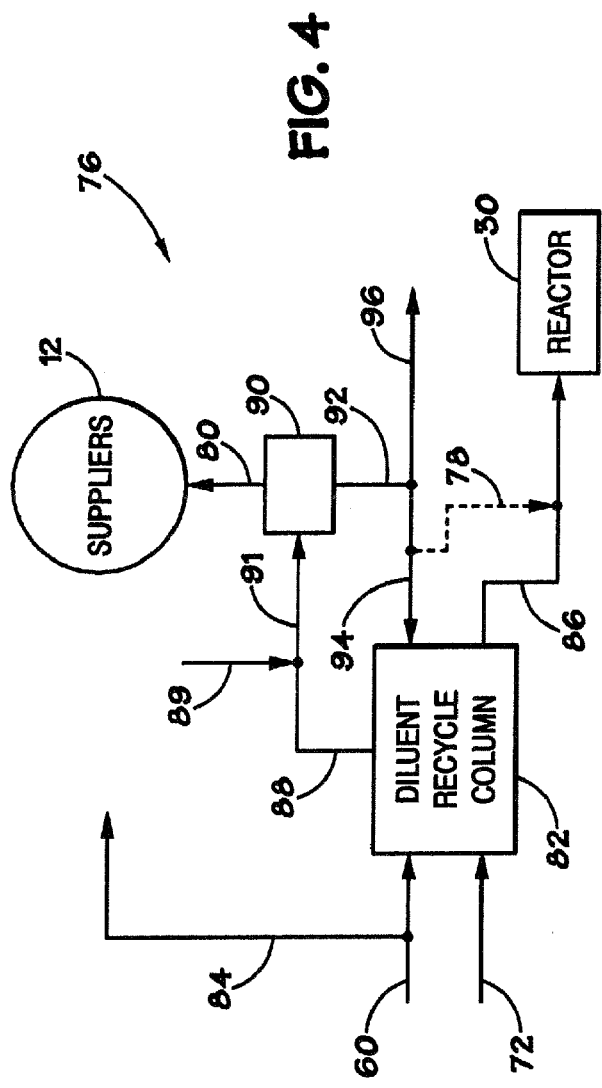

MONOMER RECOVERY BY RETURNING COLUMN OVERHEAD LIQUID TO THE REACTOR

BACKGROUND OF THE INVENTION

1. Field of the Invention

The present invention relates generally to polyolefin production and, more specifically, to increasing recovery of unreacted olefin monomer discharged from a polyolefin reactor.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what polyolefin or type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed at or near at petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and once added, suspended in the fluid medium within the reactor. An example of such a catalyst is a chromium oxide containing hexavalent chromium on a silica support. Further, a diluent may be introduced into the reactor. The diluent may be an inert hydrocarbon, such as isobutane, propane, n-pentane, i-pentane, neopentane, and n-hexane that is liquid at reaction conditions. However, some polymerization processes may not employ a separate diluent, such as in the case of selected examples of polypropylene production where the propylene monomer itself acts as the diluent.

The discharge of the reactor typically includes the polymer fluff as well as non-polymer components, such as unreacted olefin monomer (and comonomer), diluent, and so forth. In the case of polyethylene production in liquid phase reactors, such as loop slurry reactors, the non-polymer components typically comprise primarily diluent, such as isobutane, having a small amount of unreacted ethylene (e.g., 5 wt. %). For polypropylene production, the non-polymer components typically comprise primarily unreacted propylene monomer. These discharge streams are generally processed, such as by a diluent/monomer recovery system, to separate the non-polymer components from the polymer fluff. The recovered diluent, unreacted monomer, and other non-polymer components from the recovery system may be treated, such as by a fractionation system, and ultimately returned as purified or treated feed to the reactor. In some cases, the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

The competitive business of polyolefin production continuously drives manufacturers to improve their processes to lower production costs. In an industry where billions of pounds of polyolefin product are produced per year, small incremental improvements, for example, in catalyst activity, monomer yield, and diluent recovery, can generate significant cost savings in the manufacture of polyolefins. Fortunately, technological advances over the years in raw materials, catalyst productivity, energy efficiency, equipment design and operation, and the like, have provided great strides in reducing the capital, operating, and fixed costs of polyolefin manufacturing systems. For example, catalyst research has produced commercial catalysts with activity values that are orders of magnitudes higher than those of two to three decades ago, resulting in a striking reduction in the amount of catalyst consumed per pound of polymer, and also reducing the downstream processing (and equipment) used to deactivate and/or remove residual catalyst in the polymer product. Further, advances in equipment design and operation have also greatly increased diluent recovery to the point where very little fresh diluent make-up is utilized.

Technological advances have also improved monomer yield, which is a measure of the conversion of monomer, such as ethylene or propylene, to a polymer or polyolefin, such as polyethylene or polypropylene. Ideally, one pound of monomer produces one pound of polyolefin, but typical monomer-yield values (expressed as the ratio of pounds of polymer produce per pound of monomer consumed) in the industry generally hover around 95%. Further increases in monomer yield provide one of the greatest opportunities to reduce the cost to manufacture polyolefins. Indeed, olefin monomer is typically the largest cost in producing polyolefins, with small incremental improvements in monomer yield resulting in considerable cost savings. Such desired improvements in monomer yield, however, are a significant challenge in the polyolefin industry.

The polyolefin industry's struggles to increase monomer yield further are due, in part, to the difficulty of separating small amounts of monomer entrained in light component streams and vent/purge streams throughout the polyolefin process, such as in the diluent/monomer recovery and fractionation sections of the polyolefin plant. Separation of entrained monomer from these light streams is typically not feasible for a variety of reasons. As appreciated by those of ordinary skill in the art, theoretical limitations, such as azeotropes, pinch points, etc., in the separation equilibrium, for example, may preclude separation. Further, where theoretically possible, separation of the entrained monomer from the vent streams would generally require capital-intensive investments not having a justified economic return, even with the significant savings in recovered ethylene. For example, the separation and recovery of the entrained monomer may require installation of fractionation columns having design dimensions (e.g., diameter, height, number of stages or trays, reflux flow rates, etc.) that are surprisingly large. Thus, these vent streams having small concentrations of monomer, such as ethylene and propylene, are typically combusted in a flare or recycled to the olefin supplier.

A problem with incineration of the vent streams at the flare is that the entrained monomer is lost. A problem with recycling of the monomer to the olefin supplier is that the supplier often cannot effectively process the return stream because of the presence of undesirable components, such as inert components. In fact, the polyolefin producer generally receives a reduced credit for the returned monomer due to the difficult processing requirements experienced by the supplier. Even more unfortunate is that the supplier themselves may have to flare the return stream due to their inability to process the stream, and thus the polyolefin producer receives no credit for the entrained monomer in the recycle stream.

BRIEF DESCRIPTION OF THE DRAWINGS

Advantages of the invention may become apparent upon reading the following detailed description and upon reference to the drawings in which:

FIG. 1 is a block flow diagram depicting an exemplary polyolefin manufacturing system for producing polyolefins in accordance with one embodiment of the present techniques;

FIG. 4 is a block flow diagram of a portion of the feed and fractionation subsystem of the polyolefin manufacturing system of FIG. 1 in accordance with one embodiment of the present techniques;

DETAILED DESCRIPTION OF SPECIFIC EMBODIMENTS

Figure 3:
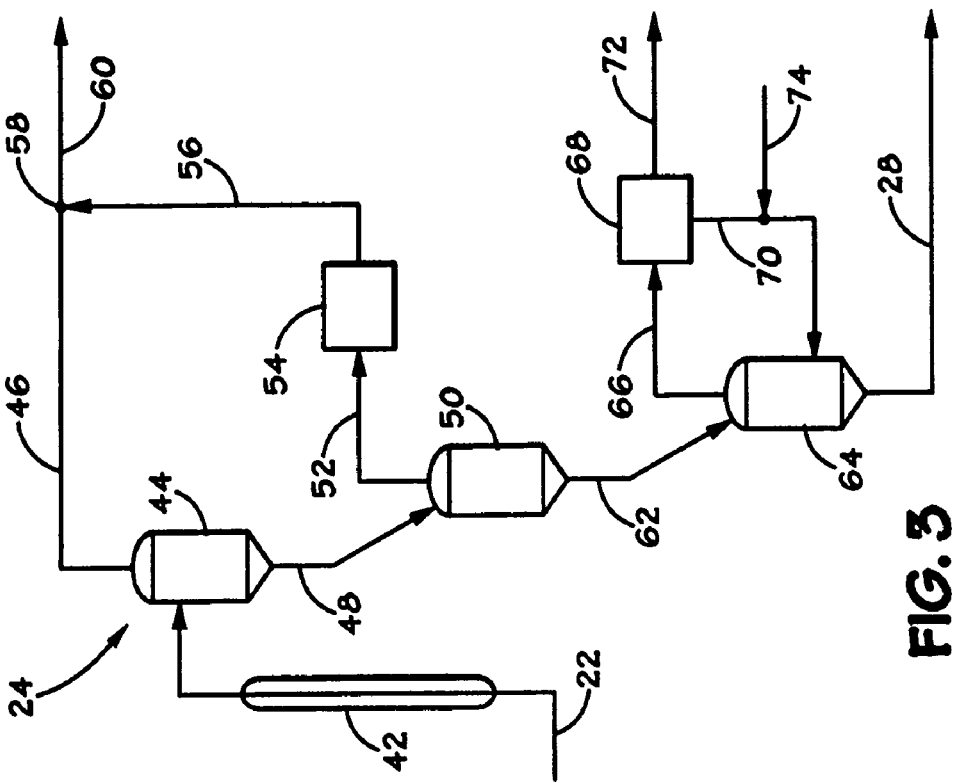
FIG. 3 is a process flow diagram of a diluent/monomer recovery subsystem of the polyolefin manufacturing system of FIG. 1 in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques relate to increased recovery of olefin monomer in a polyolefin manufacturing system. The techniques may address the polyolefin industry's difficulty in recovering the small amounts of monomer contained in light-end streams in the monomer/diluent recovery and fractionation sections of the polyolefin plant. Such vent/purge streams having small concentrations of entrained monomer, such as ethylene or propylene, are typically flared, giving total loss of the contained monomer, or recycled to the olefin supplier for further processing which may be problematic and/or costly.

In response, the present techniques avoid the feasibility problems of separating the monomer from the lights streams and, instead, provide for diversion of liquid having small amounts of monomer within the fractionation system to the polymerization reactor, such as a loop slurry reactor. The techniques recover monomer (i.e., to the reactor) while avoiding the difficult and expensive approaches of separating entrained monomer from the vented light streams. The techniques advantageously displace monomer feedstock while reducing the amount of monomer that may amass in the fractionation system and that may be vented to the flare or returned to the supplier. In particular, the techniques provide for diverting portions of column overhead liquid and/or liquid streams recycling internally within the fractionation system to the polyolefin reactor. The column overhead liquid and liquid streams may contain unreacted monomer that enters the fractionation system in the recovered effluent from the polyolefin reactor. In one embodiment with polyethylene production, a portion of a reflux stream to a diluent recycle column and containing primarily diluent with small amounts of ethylene is diverted to the diluent storage tank that supplies diluent to the loop slurry reactor. The ethylene in the diverted diluent stream displaces ethylene feedstock fed to the reactor. Thus, the ethylene in the diverted stream is recovered.

Finally, it should be noted that though the discussion at times may focus on polyethylene production, the present techniques are applicable to other polymerization and polyolefin processes, which typically recover unreacted components from the discharge of the polymerization reactor. For example, the techniques may apply in polypropylene production which employ a recovery and/or fractionation system disposed downstream of the polymerization reactor to recover unreacted components, such as diluent, solvent, and/or unreacted propylene monomer, and so on, from the effluent exiting the polymerization reactor.

To facilitate discussion of the present techniques, the disclosure is presented in sections. Section I introduces an exemplary polyolefin production process, which includes a feed and fractionation subsystem, a reactor subsystem, a diluent/monomer recovery subsystem, and an extrusion/loadout subsystem. Section I also gives examples of polyolefin applications and end-uses, as well as briefly discusses exemplary control of a polyolefin production process. Section II discusses an exemplary reactor subsystem in more detail. Section III discusses an exemplary diluent/monomer recovery subsystem which receives a reactor discharge (effluent). Section IV discusses the processing of recovered diluent from the diluent/monomer recovery system in an exemplary feed and fractionation subsystem, including a discussion of diluent purification and exemplary fractionation columns (e.g., heavies column and lights column) in the fractionation subsystem. Section V provides an overview of techniques for recovery of additional monomer (e.g., ethylene) in the fractionation subsystem. Section VI discusses fractionation and an exemplary process of recovering additional monomer in more detail. Section VII summarizes an exemplary method for increasing monomer yield via recycle to the reactor of a portion of an accumulated liquid in the fractionation subsystem. Section VIII provides a sample calculation of savings due to increased ethylene yield resulting from the exemplary method for increasing monomer yield.

I. Polyolefin Production Process Overview

Turning now to the drawings, and referring initially to FIG. 1, a block diagram depicts an exemplary manufacturing process 10 for producing polyolefins, such as polyethylene, polypropylene and/or their copolymers. The manufacturing process 10 is typically a continuous operation but may include both continuous and batch systems. A typical nominal capacity for the exemplary manufacturing process 10 is about 400-800 million pounds of polyolefin produced per year. Exemplary hourly design rates are approximately 50,000 to 100,000 pounds of polymerized/extruded polyolefin per hour. It should be emphasized, however, that the present techniques apply to polyolefin manufacturing processes having nominal capacities and design rates outside of these exemplary ranges.

Various suppliers 12 may provide reactor feedstocks 14 to the manufacturing system 10 via pipeline, trucks, cylinders, drums, and so forth. The suppliers 12 may comprise off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler-Natta catalysts, chromium catalysts, nickel, and metallocene catalysts), co-catalysts (such as triethylaluminum, triethylboron, and methyl aluminoxane), and other additives.

A. Feed and Fractionation Subsystem

The suppliers 12 typically provide feedstocks 14 to a feed and fractionation subsystem 16, where the feedstocks 14 may be stored, such as in monomer storage and feed tanks, diluent vessels, catalyst tanks, co-catalyst cylinders and tanks, and so forth. In the subsystem 16, the feedstocks 14 may be treated or processed prior to their introduction into the polymerization reactors. For example, feedstocks 14, such as monomer, comonomer, and diluent, may be sent through treatment beds and fractionation columns to remove catalyst poisons, such as oxygen and moisture, and to remove undesirable heavy and light components. The olefin monomer and comonomers may be liquid, gaseous, or a supercritical fluid, depending on the type of reactor being fed. The subsystem 16 may prepare or condition other feedstocks 14, such as catalysts for addition to the polymerization reactors. For example, catalyst may be activated and then mixed with diluent (e.g., isobutane or hexane) or mineral oil in catalyst preparation tanks. Further, the feed and fractionation subsystem 16 typically provides for metering and controlling the addition rate of the feedstocks 14 into the polymerization reactor to maintain the desired reactor stability and/or to achieve the desired polyolefin properties or production rate. Moreover, as discussed below, the subsystem 16 may also purify or treat recovered reactor effluent for recycle to the reactor. Indeed, fractionation and treatment of recycled diluent and monomer is generally important to the economics of polyolefin production. The feedstocks 14 and recovered reactor effluent are processed in the feed and fractionation subsystem 16 and exit as feed streams 18 (e.g., streams of monomer, comonomer, diluent, catalysts, co-catalysts, hydrogen, additives, or combinations thereof) and enter the reactor subsystem 20.

The feed portion of the subsystem 16 is generally considered upstream of the polymerization reactor, and typically directed primarily to the storage, processing, and metering of feedstocks and fractionated recycle material. The fractionation portion of subsystem 16 may be considered downstream of the polymerization reactor and may be directed to the processing of recovered reactor effluent from the reactor. In some cases, the recovered effluent processed in the fractionation portion may be recycled to the reactor via the feed portion of subsystem 16. The feed and fractionation portions of subsystem 16 typically overlap in equipment and processing steps, and both may ultimately provide feed to the polymerization reactor.

1. Fractionation of Recovered Reactor Effluent

Embodiments of the present techniques directed to the fractionation portion of subsystem 16 generally provide relatively more benefit to those recovery technologies that fractionate a larger portion (i.e., less direct recycle to the reactor) of the recovered components discharging from the reactor. In some technologies, up to about 90% of the recovered components may bypass the fractionation portion of the subsystem 16. In other technologies, however, substantially the entire amount of diluent and unreacted monomer recovered from the slurry effluent discharging from the polymerization reactor may be processed by the fractionation portion of the subsystem 16 prior to recycle to the reactor. Generally, in certain configurations, at least some of the reactor liquid effluent (e.g., 10%) may be fractionated to provide for olefin-free diluent, for example, to be used in catalyst preparation/delivery to the polymerization reactor.

2. The Process of Fractionation

A fractionation or distillation column system, such as those employed in subsystem 16, may include a variety of equipment and operations that provide for heat and material transfer. Fractionation or distillation, in general, is a process of separating a feed mixture into two or more streams that have different boiling points, by preferentially boiling the more volatile components out of the feed mixture. When a liquid feed mixture of two volatile materials is heated, the resulting vapor typically has a higher concentration of the more volatile (i.e., lower boiling point) material than the liquid from which it evolved. Conversely, if a vapor is cooled, the less volatile (i.e., higher boiling point) material has a tendency to condense in a greater proportion than the more volatile material.

a. Feed to the Fractionation Column

A feed containing the chemical components to be separated generally enters at a point along the straight side of a column. The position of this feed point along the column may be an important variable in the design of the column. In the fractionation system of the polyolefin process, an exemplary feed to a fractionation column is the vapor and/or liquid recovered from effluent that discharges from the polyolefin reactor. This exemplary feed to the fractionation column may contain diluent, unreacted monomer, and other components. The separation in the fractionation system may involve separating components from the diluent, or in other words, purifying the diluent.

b. Distillation Stages

Within the column, liquid and vapor are typically in countercurrent contact throughout the column as the liquid flows down and the vapor flows up the column. At each distillation "stage," some of the vapor moving up the column is condensed and this in turn may evaporate some of the liquid moving down the column. For the example of two components in a feed stream, a greater amount of the less volatile component will condense at each stage and a greater amount of the more volatile component will evaporate. The "rectifying section" and "enriching section" are exemplary names given to the stages within the column above the feed point where the concentration of the more volatile component increases in both the liquid and the vapor. The "stripping section" is an exemplary name given to the stages below the feed point where the concentration of the more volatile component decreases in both the liquid and the vapor. Various column internals, such as trays, plates, and/or packing may provide for the separation stages.

A fractionation column may include trays of various designs used to hold up the liquid to provide better contact between vapor and liquid, and hence better separation. Types of trays include, for example, bubble cap trays, valve trays, sieve trays, and the like. Each tray typically has conduits (e.g., two conduits, one on each side of the tray) called "downcomers." Liquid may fall through the downcomers by gravity from one tray to the tray below. A weir on the tray may facilitate accumulation or "hold up" of liquid on the tray. The vapor flowing up through the column flows through the liquid on the trays. A fractionation column may also include packings which are generally passive devices designed to increase the interfacial area for vapor-liquid contact. Because of the manner in which vapor and liquid are contacted, packed columns may be called continuous-contact columns (providing for theoretical stages) while trayed columns may be called staged-contact columns.

c. Column Overhead

The overhead vapor exiting the top of a column, such as those employed in subsystem 16, generally contains the most volatile components from the feed. The overhead vapor typically enters a condenser, such a shell and tube heat exchanger, which may employ a cooling medium, such as cooling tower water or sea water, to condense or partially condense the overhead vapor into a liquid. The liquid from the condenser may be split into at least two parts: (1) a reflux fed back to the column generally near the top of the column where the liquid reflux then moves down inside the column in countercurrent flow with the vapor flowing up the column; and (2) an overhead or top product or "distillate" containing liquid with a composition specified in the design of the column. The ratio of the reflux flow rate to the overhead product flow rate is generally called the reflux ratio and may be an important parameter in the design and operation of a fractionation or distillation column. Moreover, as discussed below, the condensed liquid exiting the condenser may be collected in a reflux drum, accumulator vessel, or other vessel, prior to being used or pumped as a reflux and/or as a product.

d. Column Bottoms

The bottom liquid exiting the base portion of the column generally contains the least volatile components and is typically fed to a heat exchanger generally called a reboiler. In the reboiler, a heating medium, such as steam or steam condensate, may be used to vaporize a portion of the bottom liquid. The vapor exiting the reboiler is typically fed back to the column near the bottom of the column and flows up the column in countercurrent flow with the liquid moving down inside the column. The amount of heat input to the reboiler may determine the vapor flow rate up the column. The portion of the bottom liquid not sent through the reboiler may be collected as a second product stream (or waste stream) from the fractionation column.

e. Column Side Streams

Furthermore, one or more side product streams may exit the fractionation column. The location and composition of the side product stream(s) may depend, for example, on the desired separated component and/or concentration of the component. The location of the side stream along the column may also depend on the desired boiling point range of the side stream, and so forth.

B. Reactor Subsystem

The reactor subsystem 20 may comprise one or more reactor vessels, such as liquid-phase or gas-phase reactors. The reactor subsystem 20 may also comprise a combination of liquid and gas-phase reactors. If multiple reactors comprise the reactor subsystem 20, the reactors may be arranged in series, in parallel, or in some combination configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst for polymerizing the monomers is typically added to the reactor. The catalyst may be a particle suspended in the fluid medium within the reactor. An example of such a catalyst is chromium oxide containing hexavalent chromium on a silica support. Further, diluent may fed into the reactor, typically a liquid-phase reactor. The diluent may be an inert hydrocarbon that is liquid at reaction conditions, such as isobutane, propane, n-pentane, i-pentane, neopentane, and n-hexane. The purpose of the diluent is generally to suspend the catalyst particles and polymer within the reactor. Some polymerization processes may not employ a separate diluent, such as in the case of selected polypropylene production where the propylene monomer itself may act as the diluent.

A motive device may be present within the reactor in the reactor subsystem 20. For example, within a liquid-phase reactor, such as a loop-slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug-flow reactor, one or more paddles or stirrers may be used to mix the solid particles within the reactor.

C. Diluent/Monomer Recovery Subsystem

The discharge 22 of the reactors within subsystem 20 may include the polymer fluff as well as non-polymer components, such as diluent, unreacted monomer/comonomer, and residual catalyst. The discharge 22 may be subsequently processed, such as by a diluent/monomer recovery subsystem 24, to separate non-polymer components 26 from the polymer fluff 28. The untreated recovered non-polymer components 22 may be further treated, such as by feed and fractionation subsystems 16, and returned to the reactor subsystem 20 or to the suppliers 12. The fluff 28 may be further processed within the recovery subsystem 24 as well as, in the extrusion/loadout subsystems 29, to prepare it for shipment to customers 31. Finally, although not illustrated, polymer granules intermediate in the recovery subsystem 24 and typically containing active residual catalyst may be returned to the reactor subsystem 20, for further polymerization, such as in a different type of reactor or under different reaction conditions.

D. Extrusion/Loadout Subsystem

In the extrusion/loadout subsystems 29, the fluff 28 may be stored and is typically extruded to produce polymer pellets 33 with the desired mechanical, physical, and melt characteristics. Extruder feed may comprise additives, such as UV inhibitors and peroxides, which are added to the fluff products 28 to impart desired characteristics to the extruded polymer pellets. An extruder/pelletizer receives the extruder feed, comprising one or more fluff products 28 and whatever additives have been added. The extruder/pelletizer heats and melts the extruder feed which then may be extruded through a pelletizer die under pressure to form polyolefin pellets. Such pellets are typically cooled (and transported) in a water system disposed at or near the discharge of the pelletizer.

The polyolefin pellets may then be transported to a product load-out area where the pellets may be stored, blended with other pellets and/or loaded into railcars, trucks, bags, and so forth, for distribution to customers 31. In the case of polyethylene, pellets 33 shipped to customers 31 may include low density polyethylene (LDPE), linear low density polyethylene (LLDPE), medium density polyethylene (MDPE), high density polyethylene (HDPE), and enhanced polyethylene. The various types and grades of polyethylene pellets 33 may be marketed, for example, under the brand names Marlex® polyethylene or MarFlex™ polyethylene of Chevron Phillips Chemical Company, LP, of The Woodlands, Texas, USA.

E. Customers, Applications, and End-Uses

Polyolefin (e.g., polyethylene) pellets 33 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 33 may be further processed and assembled for distribution and sale to the consumer. For example, a polyethylene milk bottle may be filled with milk for distribution to the consumer, or the fuel tank may be assembled into an automobile for distribution and sale to the consumer. To form the end-products or components from the pellets 33 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on.

1. Blow Molding, Injection Molding, and Rotational Molding

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 33, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

2. Downstream Extrusion Processes

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Sheet extrusion is a technique for making flat plastic sheets from a variety of pellet 33 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal. Finally, polyolefin pellets may also be supplied for the extrusion coating and lamination industry.

3. Blown Film and Cast Film

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths.

F. Exemplary Control of Polyolefin Production

Process variables in the manufacturing system 10 may be controlled automatically and/or manually via valve configurations, control systems, and so on. In general, a control system, such as a processor-based system, may facilitate control of a range of operations in the polyolefin manufacturing system 10, such as those represented in FIG. 1. Polyolefin manufacturing facilities may include a central control room or location, as well as a central control system, such as a distributed control system (DCS) and/or programmable logic controller (PLC). Of course, the reactor subsystem 20 typically employs a processor-based system, such as a DCS, and may also employ advanced process control known in the art. A processor-based system, such as the DCS, may also facilitate control of other operations, such as the diluent recovery and fractionation systems (e.g., lights and heavies fractionation columns). In the dry end of the plant, the extruder and/or pellet loading operations may also be controlled via a processor-based system (e.g., DCS or PLC).

The control system(s) in the manufacturing process 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used in a variety of control purposes via the control system.

The control systems may be wired and/or wireless, and may offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system on the other. Moreover, as indicated, the control system typically includes hardware/software for control, interface, database management, and so on. In operation, the control system may transfer data and commands using communication protocols such as Ethernet or other open standards, or a proprietary standard, depending upon the DCS vendor, for example. Proprietary protocols may require specialized equipment to perform their functions.

A DCS may be as simple as one PLC remotely connected to a computer located in a field office. Larger systems may be PLC based, but also consist of specially designed cabinets containing equipment used to provide I/O and communication. A distributed system may allow remote nodes to operate independently of the central control facility should the facility go off line or lose communication capability. Remote nodes may store process data used to operate in the event of such a failure.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room may contain a Human Machine Interface (HMO), which may be a computer, for example, that runs specialized software to provide a user-interface for the control system. The HMI may vary by vendor and present the user with a graphical version of the remote process. There may be multiple FIMI consoles or workstations, with varying degrees of access to data. Authorization schemes may afford a degree of security, ensuring that only properly trained and authorized personnel operate the various parts of the facility via the HMI and control system.

II. Polymerization Reactor Subsystem

Figure 2:
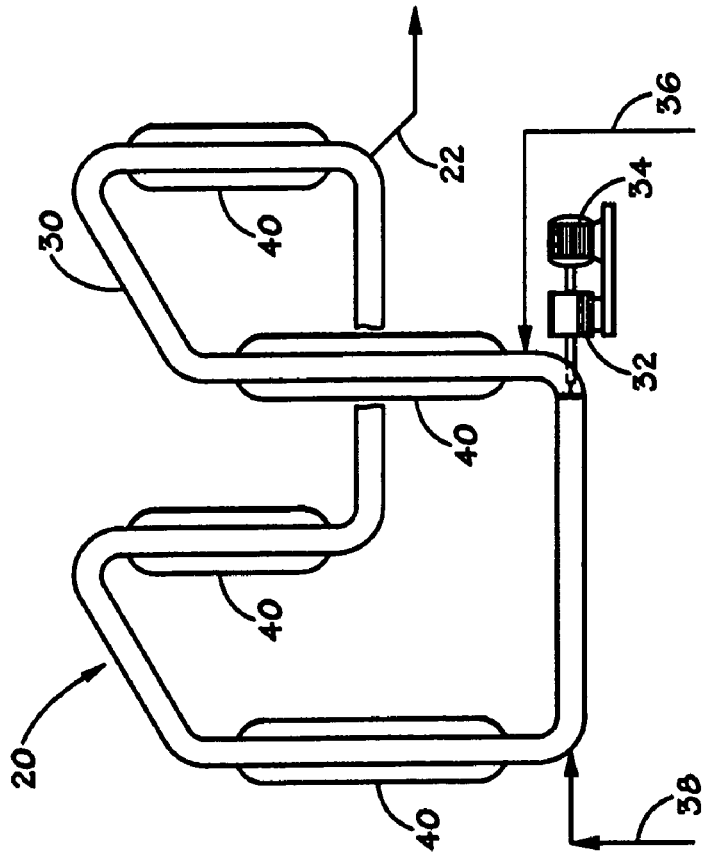
FIG. 2 is a process flow diagram of a reactor subsystem of the polyolefin manufacturing system of FIG. 1, including a polymerization reactor in accordance with one embodiment of the present techniques.

Referring to FIG. 2, a process flow diagram of an exemplary polymerization reactor subsystem 20 (of FIG. 1) is depicted. As discussed above, the reactor subsystem 20 itself may comprise one or more polymerization reactors, which may in turn be of the same or different types. Furthermore, in multiple reactor subsystems, the reactors may be arranged serially or in parallel. Whatever the reactor types comprising the reactor subsystem 20, a polyolefin particulate product, generically referred to as "fluff" herein, is produced. To facilitate explanation, the following examples are limited in scope to specific reactor types believed to be familiar to those skilled in the art and to single reactors or simple combinations. To one skilled in the art, however, the present techniques are simply and easily applicable to more complex reactor arrangements, such as those involving additional reactors, different reactor types, and/or alternative ordering of the reactors or reactor types. Such arrangements are considered to be well within the scope of the present invention.

One reactor type comprises reactors within which polymerization occurs within a liquid phase. Examples of such liquid phase reactors include autoclaves, boiling liquid-pool reactors, loop slurry reactors, and so forth. For simplicity, a loop slurry reactor 30 for producing polyethylene (and its copolymers) will be discussed in the context of the present techniques though it is to be understood that the present techniques are similarly applicable to other types of liquid phase reactors.

The loop slurry reactor 30 is generally composed of segments of pipe connected by smooth bends or elbows, and may be oriented in the vertical or horizontal directions. The reactor 30 may be used to carry out polyethylene polymerization under slurry conditions in which insoluble particles of polyolefin, such as polyethylene or polypropylene are formed in a fluid medium and are suspended as slurry until removed. A motive device, such as pump 32, circulates the fluid slurry in the reactor 30. An example of a pump 32 is an in-line axial flow pump with the pump impeller disposed within the interior of the reactor 30 to propel the fluid medium through the closed loop of the reactor 30 at sufficient speed to keep solid particulates, such as the catalyst or polyolefin product, suspended within the fluid medium. In this example, the pump 32 also creates a turbulent mixing zone within the fluid medium. The impeller may be driven by a motor 34 or other motive force. Moreover, other types of pumps 32, such as radial flow pumps, mixed flow pumps (e.g., combination of axial flow and radial flow), and so on, may be employed. In addition, guide vanes and other items may be employed in conjunction with the pump 32.

The fluid medium within the reactor 30 may include olefin monomers and comonomers, diluent, co-catalysts (e.g., triethylboron, methyl aluminoxane, alkyls such as triethylaluminum, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 36, which generally corresponds to one of the feed streams 18 of FIG. 1.

Likewise, a catalyst, such as those previously discussed, may be added to the reactor 30 via a conduit at a suitable location, such as depicted at feed stream 38, which may include a diluent carrier and which also generally corresponds to one of the feed streams 18 of FIG. 1. An example of a catalyst for polymerizing the ethylene monomer and comonomers which are present include a chromium oxide containing a hexavalent chromium (or $Cr^{+2}$) on a silica support. It should be explained that in certain embodiments the chromium in the catalyst feedstock is received at the polyolefin facility as $Cr^{+3}$. This catalyst may be subjected to a carbon monoxide (CO) activation process resulting in a valence change to $Cr^{+6}$ in the activated catalyst. Subsequently, during polymerization in the reactor, the $Cr^{+6}$ valence in the activated catalyst to changes $Cr^{+2}$ due to the presence of monomer (e.g., ethylene) in the polymerization contents in the reactor. Advantageously, the $Cr^{+2}$ sites in the catalyst are active for polymerization.

In total, the added components in the reactor generally compose a fluid medium within the reactor 30 within which the catalyst is a suspended particle. The reaction conditions, such as temperature, pressure, and reactant concentrations, are regulated to facilitate the desired properties and production rate of the polyolefin in the reactor, to control stability of the reactor, and the like. Temperature is typically maintained below that level at which the polymer product would go into solution. As indicated, due to the exothermic nature of the polymerization reaction, a cooling fluid may be circulated through jackets 40 around portions of the loop slurry reactor 30 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the reactor 30, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 30 via a settling leg or other means, such as a continuous take-off, as depicted discharge stream 22. In downstream processing, the polyolefin discharged from the reactor may be extracted from the slurry and purified.

III. Diluent/Monomer Recovery Subsystem

Referring to FIG. 3, a process flow diagram of an exemplary diluent/monomer recovery system 24 of FIG. 1 is depicted. Of course, those skilled in the art will recognize that other configurations may be used in conjunction with the present techniques.

A. High Pressure Flash

In this example, the reactor discharge 22 flows through an in-line flash heater 42 and into a high pressure flash chamber 44. The in-line flash heater 42 may be a surrounding conduit which uses steam or steam condensate, for example, as a heating medium to provide indirect heating to the discharge 22. Thus, the loop slurry reactor 30 effluent is heated prior to its introduction into the high pressure flash chamber 44. Also, before the discharge 22 (reactor effluent) enters the high pressure flash chamber 44, water or other catalysts poisons may be injected into the discharge 22 to deactivate any residual catalysts in the discharge 28 stream. Because these injected components are catalysts poisons by definition, they are typically completely removed, or at least substantially removed, from any recovered material (e.g., monomer or diluent) recycled to the reactor 30 (FIG. 2).

In the high pressure flash chamber 44, most of the non-solid components of the reactor discharge 22 are withdrawn overhead as vapor in the high-pressure flash gas 46. In polyethylene production, this vapor is typically primarily diluent, such as isobutane. It may also contain most of the unreacted monomer (e.g., ethylene) and other light components, as well as unreacted comonomer (e.g., 1-hexene) and other heavy components (e.g., hexane and oligomers). An exemplary approximate composition of the flash gas 46 is 90-95 wt. % diluent (e.g., isobutane), 4-8 wt. % monomer (e.g., ethylene), and 1-2 wt. % other components. Of course, other ranges and components may comprise the flash gas 46, depending, for example, on the particular application, the type of polyolefin produced in the upstream polymerization reactor 30, the operating conditions of the reactor 30, and so on. Similarly, it should be emphasized that the present techniques apply to the processing of flash gas 46 having component ranges outside of the stated exemplary ranges.

As for the solids (polymer) in the high pressure flash chamber 44, they are withdrawn with a small amount of entrained diluent (and monomer) and sent to a low pressure flash chamber 50 via a solids discharge conduit 48. As will be appreciated by those of ordinary skill in the art, solids discharge conduit 48 may include valve and/or equipment configurations that allow polymer to flow downward through the conduit while reducing the potential for vapor to flow between the low pressure flash chamber 50 and the high pressure flash chamber 44.

B. Low Pressure Flash

The low pressure flash chamber 50 provides a second flash zone typically at a much lower pressure, where the solids are further separated from the entrained diluent and monomer. The flashed liquid and vapor exit overhead from the low pressure flash chamber 50 as low pressure flash gas 52 to a pressurizing means, such as a multistage flash gas compressor 54 which may include an interstage cooler, for example. The resulting compressed and cooled gas (mostly diluent, monomers, nitrogen, butane and hexane) with a trace of other materials (oligomers, hydrogen, methane, propane, water) is the pressurized low pressure flash gas 56 and is combined (i.e., at point 58) with the high pressure flash gas 46 to give a combined flash gas stream 60. Before entering the feed and fractionation subsystem 16 (FIG. 1), the combined flash gas stream 60 may be further processed, such as passed through a deoxygenation bed or guard filter to remove oxygen or moisture, passed through a cyclone and/or bag filter to remove entrained solid particles, and so forth. Any separated particles may be sent to a purge column 64 discussed below. Note also that solid particles may also be removed upstream via cyclones or bag filters situated in the flash gas 46 and 52 conduits, and the separated solid particles also introduced into the purge column 64.

C. Purge Column

The primary solids feed to the purge column 64 is typically the solids discharge 62 (polyolefin fluff) that exits the low pressure flash chamber 50. A purpose of the purge column 64 is to remove residual hydrocarbon from the entering solids streams. In this example, nitrogen is circulated through purge column 64 to remove residual hydrocarbons via overhead discharge 66. This discharge 66 may be sent through a separation unit 68, such as a membrane recovery unit, pressure swing adsorption unit, refrigeration unit, and so forth, to recover nitrogen via nitrogen stream 70 and to discharge a combined nitrogen/hydrocarbon stream 72 to the feed and fractionation subsystems 16. In certain processes in the art, the separation unit 68 may be known as an Isobutane Nitrogen Recovery Unit (INRU). Fresh nitrogen 74 may be added to the nitrogen circuit to account for nitrogen losses in the combined stream 72. As for the solids in the column 64, the treated polymer particles discharge purge column 64 as polymer fluff 28, which then may be processed in a conventional finishing operation, such as a screw extruder, in the extrusion/load out subsystem 29 (FIG. 1).

D. Alternate Configurations

As will be appreciated by those of ordinary skill in the art, a variety of configurations may be employed in the diluent/monomer recovery subsystem 24. For example, the solids discharge 48 from the high pressure flash chamber 44 may be sent to another reactor, (e.g., a gas phase reactor) instead of to the low-pressure flash chamber 50. In this alternate configuration, catalyst poison may not be injected upstream in the discharge 22, and, thus, residual active catalysts remain for further polymerization.

In another configuration, the flash gas 46 that exits overhead from the high pressure flash chamber 44 may not be combined with the flash gas 56 from the low pressure flash chamber, but instead treated in a deoxygenation bed, for example, and recycled directly to the reactor, bypassing the fractionation subsystem 16. In this example, the flash gas 46 may be condensed in a heat exchanger and fed to the reactor via a diluent feed system comprising a storage tank and feed pump. Further, the high pressure flash tank 44 may be operated a higher pressure to promote downstream condensation and recycling of the flash gas 46 to the reactor, or at a lower pressure to flash more diluent/monomer into the flash gas 46, and so forth.

Additionally or alternatively, the low pressure flash chamber 50 may be eliminated from the recovery subsystem 20 configuration. In this case, the purge column 64 accommodates the entire residual hydrocarbon exiting in the solids discharge 48 from the high pressure flash chamber 44. Therefore, the combined hydrocarbon/nitrogen stream 66 entering the separation unit 68 would also generally include hydrocarbon from the eliminated low pressure flash stream 56. Accordingly, the separation unit is generally sized larger to accommodate a combined hydrocarbon/nitrogen stream 72 having more hydrocarbons (e.g., diluent and monomer). Furthermore, a level (or greater level) of polymer particles may be maintained in the high pressure flash chamber 44 to facilitate separation of hydrocarbon entrained in the pores of the polymer particles in the high pressure flash chamber 44 before the polymer particles enter the purge column 64.

Conversely, the purge column 64 may be eliminated from the recovery subsystem 20 configuration. Thus, without utilization of the purge column 64, the low pressure flash tank 50 accommodates the residual hydrocarbon in the solid discharge 48 from the high pressure flash tank 44. Further, or alternatively, a downstream extruder feed silo system in the extruder/loadout subsystem 25, for example, may assist in removal of the residual hydrocarbon.

As can be appreciated from the above discussion, a variety of configurations may be employed with the flash chambers 44 and 50, the purge column 64, and the various flash gas streams in the recovery system 24. Moreover, the sizing and/or arrangement of the downstream fractionation columns in the fractionation subsystem 16 may vary depending on the configuration utilized in the recovery subsystem 24. Whatever the configuration of either the recovery subsystem 24 or the fractionation subsystem 16, embodiments of the present techniques providing for diversion of an internal recycle stream (e.g., a reflux stream) within the operating fractionation subsystem 16 to a diluent feed system are still applicable, though the quantity and economics of the monomer recovery may vary.

IV. Diluent Recycle in the Feed and Fractionation Subsystem

A. Diluent Purification

A purpose of the feed and fractionation subsystems 16 in polyolefin or polyethylene production is to purify the diluent discharged from the loop slurry reactor 30 and flashed/recovered in the diluent/monomer recovery subsystem 24. The flashed diluent may be condensed and passed through a treater, such as a molecular sieve system, before re-entry to the loop slurry reactor 30. The treater may remove undesirable components, such as the catalyst poison (e.g., water) injected upstream of the high pressure flash chamber 44 in the reactor discharge 22. Further, some or all of the recovered diluent may be sent through fractionation columns to remove heavy components, such as hexene, hexane, and oligomers, as well as, light components, such as ethane that enters with the ethylene feedstock, nitrogen from the purge column 64, unreacted ethylene from the reactor 30, and so forth. The heavy components may be labeled "heavies" and defined as components heavier than the diluent. The light components may be labeled "lights" and defined as components lighter than the diluent.

Moreover, depending on the technology employed, generally 5-100% of the flash gas exiting the recovery subsystem 24, which consists primarily of diluent, may be sent to the fractionation portion of the feed and fractionation subsystems 16, where the diluent is purified. In one arrangement, the fractionation subsystem initially removes heavy components in a heavies column (also called diluent recycle column, recycle isobutane column, dehexanizer, and the like) and then removes lighter components in a subsequent lights column (also called diluent purification column, isobutane purification column, deethanizer, and the like). It should be noted that for technologies where the feed to the fractionation subsystem 16 is primarily diluent, a majority of the process streams within the fractionation subsystem 16 may typically include diluent.

B. Heavies Column

To remove heavy components, the first column (heavies column or diluent recycle column) may discharge heavy components (e.g., hexene, hexane, and oligomers) from the bottom portion of the column to the flare. Again, these heavy components may be called "heavies" which are components heavier than the diluent employed. The first column may also produce a side stream of diluent product (e.g., isobutane, hexane, etc.) that typically contains a measurable amount of other components (e.g., ethylene, hexene, octene, etc.) but is acceptably recycled to the loop slurry reactor 30. This exemplary side stream recycled to the reactor 30 may comprise the bulk of the recovered diluent received by the fractionation subsystem 16 from the diluent/monomer recovery subsystem 24. The first column may also produce an overhead lights stream comprising primarily diluent, inert components, and monomer (e.g., ethylene), which may be partially condensed. Non-condensed components (e.g., nitrogen, ethylene) may be flared or recycled to the supplier. Condensed components of the overhead stream may be used as reflux to the first column and as reflux or feed to the second column.

C. Lights Column

To remove light components, the second column (lights column or diluent purification column), removes light components (e.g., ethylene, ethane, and nitrogen) to give a more pure diluent product which may be substantially olefin-free (with the heavy components already removed in the upstream column). The second column typically processes a smaller amount of diluent than the first column. The small stream of monomer-free (olefin-free) diluent may exit the bottom portion of the second column and be used in catalyst preparation, catalyst delivery, catalyst flushes, reactor flushes where catalyst is present, and so forth. The availability of monomer-free diluent is beneficial for these catalyst-related functions because it may be important that olefin monomer not come into contact with catalyst outside of the reactor 30 or other polymerizer. Such contact could result in polymerization in undesirable parts of the process, which may plug equipment, cause operability problems, expend catalyst, and so forth.

V. The Recovery of Additional Monomer—An Overview

Referring to FIG. 4, a flow diagram of a diluent recycle section 76 of the feed and fractionation subsystems 16 is depicted. The present techniques provide for a bypass line 78 to divert part (e.g., 5-60 wt. %) of a diluent/monomer (e.g., isobutane/ethylene) stream within the fractionation system to the loop slurry reactor 30 via, for example, a diluent feed system comprising a storage vessel and a feed pump. Incorporation of the bypass line 78 recovers additional monomer, such as ethylene, and reduces the amount of monomer loss in vent stream 80 to the supplier 12 or to the flare. As discussed below, the amount of the diluent/monomer stream that is diverted may depend, for example, on the amount of heavies in the incoming flash gas 60, various operability constraints of the diluent recycle column 82, and the reflux flow rate requirements of the column 82. Related factors in evaluating the flow rate of the diverted reflux include the allowable carry-over of heavier components in the overhead stream 88, the allowable comonomer content in the olefin-free diluent generated in the fractionation subsystem 16 (in the downstream lights column), the allowable inert accumulation in the reactor recycle streams, and so forth.

The present techniques significantly improve monomer yield and, thus, the economics of manufacturing. (See the example calculation in Section VIII.) The monomer yield may approach 100% conversion of monomer, because less monomer will accumulate in light streams and thus less purging will be required. If even though some purging may remain to prevent the accumulation of inert components, the vent streams will generally contain less monomer. Further, due to less accumulated monomer in the fractionation subsystem 16, the vent streams may be purged at a lower rate and/or intermittently, as well as with a lower concentration of monomer, and so forth.

Moreover, the economics may be especially beneficial where all of the flash gas 60 is sent through diluent recycle column 82, with no flash gas 60 bypassed in the representative line 84 (e.g., with no direct recycle of flash gas 46 to the reactor 30). In any case, the present techniques improve monomer yield and reduce the cost to produce polyolefins, such as polyethylene. Further, the techniques mitigate the increased potential for flaring of ethylene and the complications (discussed above) experienced by the olefin supplier 12 in handling vent streams having inerts and other light components.

In the illustrated embodiment, flash gas stream 60 and hydrocarbon stream 72, both from recovery subsystem 24 and depicted in FIG. 3, enter the diluent recycle column 82, which may operate typically at a pressure in the exemplary range of 125-225 psig and at a temperature in the exemplary range of 100-350° F. The column 82 fractionates a side stream of primarily diluent product 86 (e.g., isobutane) which may be sent to the reactor 30 via a recycle isobutane storage tank and pump. The column 82 may also separate light components 88 (e.g., nitrogen and ethylene) which discharge to an overhead accumulator 90. Moreover, an overhead stream 89 from a downstream diluent purification column may combine with light components 88. The combined stream 91 may pass through a heat exchanger that utilizes a cooling medium, such as cooling tower water or sea water, to cool the stream 91 before the combined stream 91 enters the accumulator 90.

In the accumulator 90, additional condensation may occur, such as with a refrigeration unit having coils, fins, etc. disposed in the conduit containing the vent stream 80, where the liquid drains back to accumulator 90 by gravity. The condensed liquid may be primarily diluent with a small concentration of dissolved monomer (e.g., 2 weight % ethylene) and exit as liquid discharge 92 from the overhead accumulator 90. This discharge 92 may be fed as reflux 94 to the diluent recycle column 82, and as reflux 96 or feed to the downstream diluent purification column.

A portion of the liquid accumulated in the overhead accumulator 90 may be recycled to the reactor 30. For example, a portion of reflux 94 may be diverted through the bypass line 78 to the reactor 30 via an exemplary diluent feed system having a diluent storage tank (or feed tank) and a feed pump. On the hand, a portion of reflux 96 (or feed) can be diverted through a bypass line to the diluent feed system. In general, such diversion recovers additional monomer (e.g., ethylene) for polymerization that might otherwise accumulate in the fractionation subsystem 16 and ultimately be vented to the supplier 12 (or to the flare) in vent gas 80 or at other purges/ vents in the fractionation subsystem 16.

VI. The Fractionation Process of Recovering Additional Monomer

Figure 5:
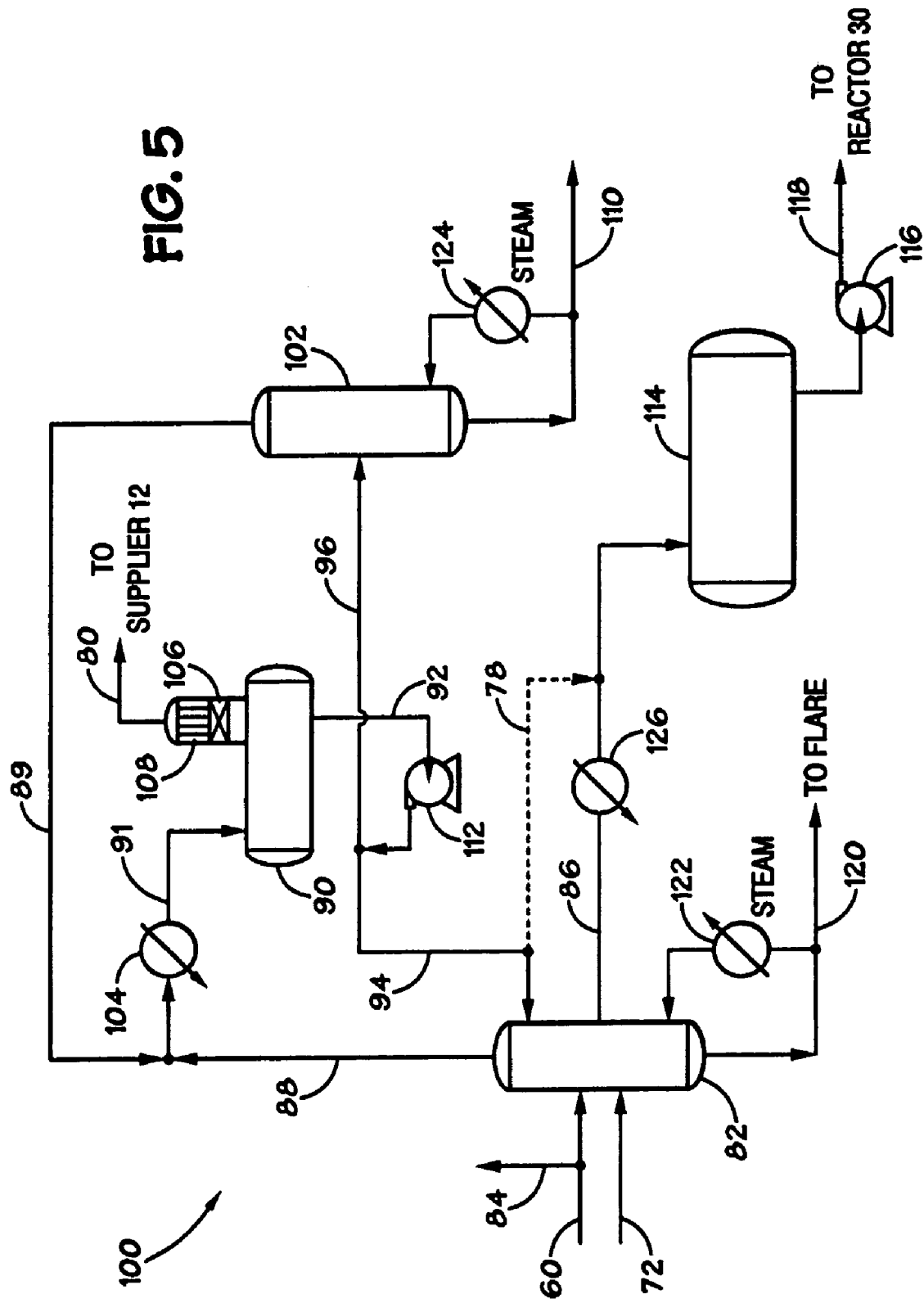
FIG. 5 is a process flow diagram of a portion of the feed and fractionation subsystem of the polyolefin manufacturing system of FIG. 1 in accordance with one embodiment of the present techniques.

Referring to FIG. 5, a process flow diagram of a portion 100 of the feed and fractionation subsystem 16 is depicted. The portion 76 of FIG. 4 is shown in greater detail and the diluent (isobutane) purification column 102 is also shown. The flash gas stream 60 (primarily diluent) together with hydrocarbon recovered from the purge column 64 via hydrocarbon stream 72 is processed in the diluent recycle column 82, which separates unreacted ethylene and lighter components, as well as the heavier components such as hexene-1, from the isobutane diluent. The entry or feed points of streams 60 and 72 into the column 82 may depend on the design basis of the fractionation system. Furthermore, streams 60 and 72 may be combined before entering the column 82. Lastly, the column 82 may also accommodate feed streams other than streams 60 and 72.

The overhead 88 from column 82 may be partially condensed in a water-cooled condenser 104 and sent via stream 91 to the accumulator 90. The uncondensed vapors are separated in the accumulator 90 and passed through a small packed column 106. Column 106 may be refluxed by a refrigerated condenser 108, and gas from the vent condenser 108 may be sent to an olefin plant, for example, for ethylene recovery. Exemplary refrigerants used in refrigerated condenser 108 are liquid propylene, liquid propane, and the like. The diluent purification column 102 may also receive a portion of the liquid from the accumulator 90 as reflux 96 to obtain an olefin-free diluent (e.g., isobutane) product 110 for reactor flushes and catalyst dilution.

Typically, for ethylene contained in the vent gas 80 sent from the condenser 108 to the supplier 12, the polyethylene production plant may be economically credited a portion of the price per pound of the price for pure ethylene feed. As discussed, at some locations, the supplier (e.g., petroleum refinery or olefin plant) may not be able to recover the ethylene in an economically viable fashion due to impurities (e.g., nitrogen) in the vent gas 80 from the vent condenser 108, and, thus, the vent gas 80 may be sent to the flare. In response, the present technique provides for sending a portion of the liquid 92 pumped as reflux 94 (via pump 112) from the accumulator 90 back to the reactor 30 via bypass line 78. In one embodiment, bypass line 78 diverts a portion of reflux 94 (or reflux 96) from the reflux pump 112 to the recycle diluent storage tank 114 which is typically equipped with a high pressure pump 116 designed to return flow back to the reactor 30. The bypass line 78 may be routed directly to the storage tank 114 or to the side stream 86 (diluent product) line. The installation may include sections of pipe, a shut off valve, control valve, a flow control circuit, and so forth. It should be noted that prior to introduction of the recycle diluent stream from the storage tank 114 to the reactor 30, the stream may undergo additional processing, such as passing through a treatment bed to remove any oxygen that may be present.

The dissolved ethylene in the liquid pumped through the bypass line 78 from the accumulator 90 and ultimately to the reactor 30 displaces plant feedstock (e.g., some of the ethylene feedstock stream 14 from supplier 12 of FIG. 1), thus crediting the polyethylene plant with 100 percent of the price of pure ethylene feed for the recovered ethylene. In certain embodiments, the vent stream 80 may be fully discontinued. It should be noted that the amount of diverted liquid returned to the reactor may be monitored and controlled to ensure that inert components (e.g., nitrogen and ethane) and ethylene, which might otherwise be sent to the ethylene plant, do not accumulate in the diluent circuit. With the present techniques, inert components may still be purged (e.g., to the flare) if desired in vent stream 80, or from the portion of the liquid reflux 94 sent to the recycle isobutane column 82 as reflux. Inert components may also be purged elsewhere in the polyethylene process.

Moreover, it should be noted that if the quantity of reflux 94 to the column 82 is reduced excessively, hexene or other comonomers heavier than the diluent may pass overhead in the light components stream 88 and ultimately to the diluent purification column 102. The hexene or other comonomers would then separate undesirably out of the bottom of the purification column 102 and contaminate the olefin-free diluent product 110. However, the light components stream 88 and/or the olefin-free diluent product 110 may be readily monitored to ensure that the streams are not contaminated with hexene or other comonomers heavier than the diluent. For example, samples of the streams may be collected and tested in the laboratory. Furthermore, the streams may be monitored on-line in substantially real time. In general, the streams may be subjected to a variety of analytical measures to determine the amount of comonomer in the streams. Such analytical measures include, for example, gas chromatography (GC), infrared spectroscopic techniques (IR, Near IR, Fourier Transform IR, Raman spectroscopy, etc.), and so on. To further control the process, results of the testing may be input to the processor-based system adapted to facilitate control if the fractionation subsystem 16 and/or other parts of the polyolefin manufacturing process 10. Such data input may be static, intermittent, dynamic, in substantially real time, and so forth. If test results are undesirable, the quantity of reflux 94 to column 82 may be increased manually or automatically, for example. In certain embodiments, such an increase in reflux 94 to column 82 may be accomplished, for example, by reducing the amount of flow through the line 78.

To complete the discussion of FIG. 5, it should be noted that a heavy component discharge 120 (e.g., hexane and oligomers) typically discharges from the column 82 bottom and is sent to flare, for example. After all, a purpose of the heavies or diluent recycle column 82 is to remove heavy components from the entering diluent. Further, as with most fractionation columns, steam reboilers 122 and 124 are typically employed at the diluent columns 82 and 102. The side stream 86 exiting recycle column 82 as diluent product may be cooled, for example, with a heat exchanger 126 that employs a cooling medium, such as cooling water, before being sent to the diluent storage tank 114. Finally, it should be emphasized that the fractionation subsystem 16 may employ a variety of configurations not illustrated. For example, the overhead 89 of the diluent purification column 102 may instead be treated with a refrigeration unit, vented, and so on, instead of, or in addition to, being transported to the condenser 104

VII. A Method for Increasing Ethylene Yield

Figure 6:
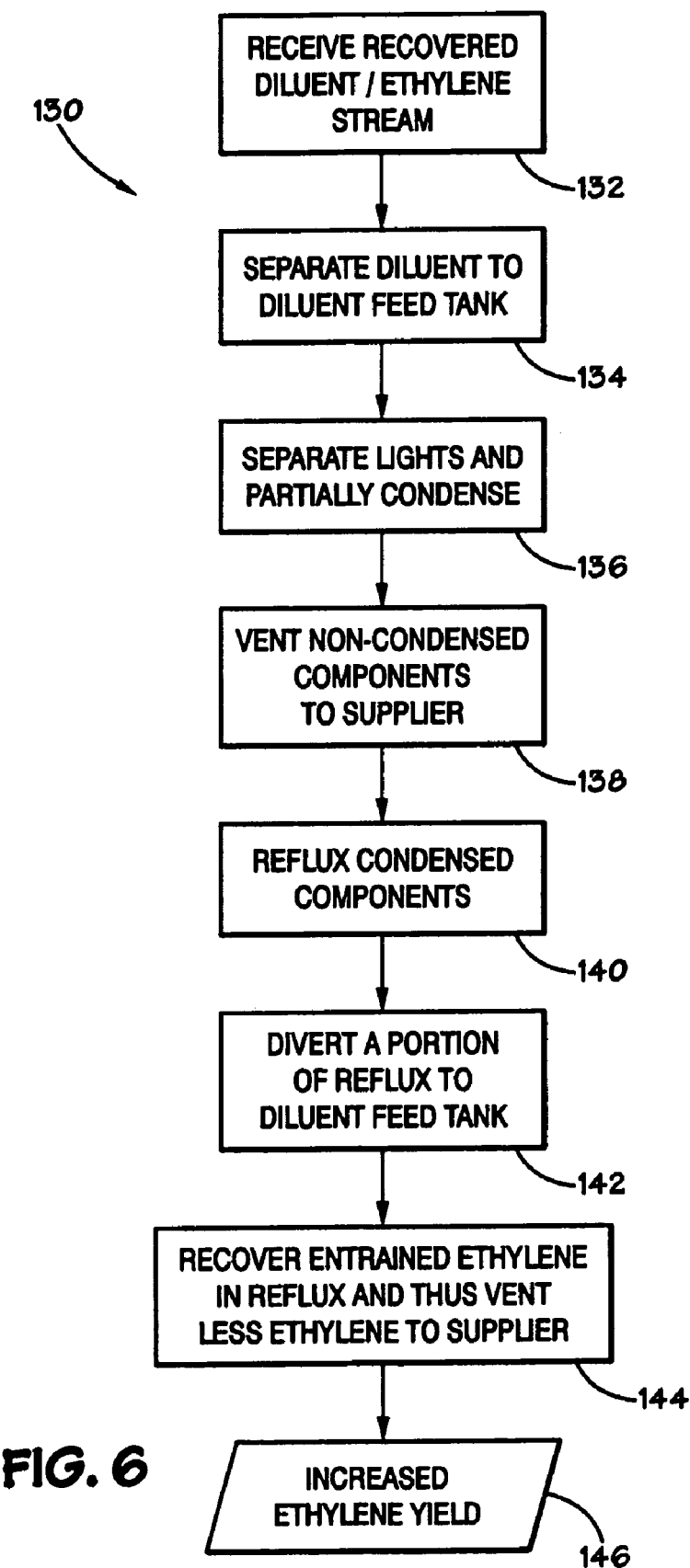
FIG. 6 is a block diagram of a method for increasing monomer yield in the production of polyolefin in accordance with one embodiment of the present techniques.

Referring to FIG. 6, a method 130 for increasing ethylene recovery, and thus increasing ethylene yield in polyethylene production, is depicted. Initially, a recovered diluent/ethylene stream from an exemplary recovery subsystem 24 (as shown in FIGS. 1 and 3) is received, as referenced in block 132. A column, such as diluent recycle column 82, may be used to separate a stream of primarily diluent. This separated stream of diluent may be cooled and sent to a diluent feed tank, such as tank 114 of FIG. 5, as referenced in block 134.

The same column 82 may be used to separate light components overhead in lights discharge 88, which may then be partially condensed, for example, with a cooler, and also with refrigeration (e.g., using propylene refrigerant) in an accumulator (block 136). Components not condensed in the accumulator 90, such as inert components and very light components, may be vented from the accumulator to a supplier 12 or to the flare (block 138). A portion of the components condensed in the accumulator 90 may be sent as reflux 94 to the column 82 (block 140). In one embodiment, the reflux 94 is primarily diluent with entrained ethylene, and may include other components. According to the present techniques, a portion of this reflux may be diverted through a conduit (e.g., bypass line 78) to the diluent feed tank, such as isobutane tank 114 (block 142). As a result, the ethylene entrained in this portion of reflux 94 diverted through bypass line 78 is recovered. Accordingly, less ethylene is vented to the supplier and/or to the flare (block 144). Whether the vent stream 80 is reduced or discontinued, ethylene yield is advantageously increased (block 146).

Update of an existing polyolefin facility or polyolefin fractionation system to incorporate the present techniques of diverting accumulated overhead liquid in the fractionation system to the polyolefin reactor may range from a relatively small investment in new equipment, such as a conduit and a control valve to divert a reflux flow, to a greater investment in equipment and systems to collect, process, divert, process and/or recycle accumulated overhead liquid and/or internal recycle streams in the fractionation subsystem 16 to the polyolefin reactor 30. As discussed, in one embodiment, a new conduit (e.g., bypass line 78) may be routed from a reflux stream 94 of the diluent recycle column 82 in a fractionation portion of the exemplary subsystem 16 to a feed portion of the subsystem 16, which provides feed to a polyolefin or polymerization reactor 30. In this example, one end of the bypass line 78 ties into the reflux stream 94 downstream of a reflux pump 112 of the diluent recycle column 82, and the other end of the bypass line 78 ties into the side product stream 86 of the diluent recycle column 82 upstream of the diluent feed tank 114. Diluent may be supplied to the polyolefin reactor 30 from the feed tank 114 via a feed pump 116 and feed conduit 118 disposed downstream of the feed tank 114. Moreover, a valve, such as a manual valve or control valve, for example, may be installed on the bypass line 78 to regulate a flow rate of a portion of the reflux stream diverted through the conduit to the feed system of the reactor 30.

In operation, the flow rate of the portion of the reflux stream 94 diverted through the bypass line 78 may be regulated to displace a portion of a monomer feedstock fed to the polyolefin reactor 30 without significant adverse impact on the operation of the diluent recycle column 82. The flow rate of the portion of the reflux stream through the bypass line 78 may be regulated inversely, for example, with the concentration of the comonomer in the overhead stream (light components stream 88) of the diluent recycle column 82. As discussed, the concentration of the comonomer in the overhead stream may be measured or monitored. Moreover, the flow rate through the bypass line 78 may also be regulated inversely with the concentration of a comonomer heavier than the diluent in the bottoms stream (olefin-free diluent 110) of the diluent purification column 102 disposed downstream of the recycle column 82.

What is claimed is:

1. A polyolefin production system, comprising:
   a first fractionation column configured to fractionate a feed stream comprising a diluent and an olefin monomer recovered from a polymerization reactor, wherein the first fractionation column is configured to discharge:
      a side product stream comprising a majority of the diluent,
      an overhead vapor stream comprising components lighter than the diluent, and
      a bottoms stream comprising components heavier than the diluent;
   a condenser configured to receive and partially condense the overhead vapor stream into a condensed liquid comprising a quantity of the monomer from the feed stream; and
   wherein a first portion of the condensed liquid is transported to the polymerization reactor.

2. The polyolefin production system as recited in claim 1, comprising a diluent feed system configured to transport the side product stream to the polymerization reactor.

3. The polyolefin production system as recited in claim 1, comprising an accumulator vessel configured to receive and collect the condensed liquid from the condenser.

4. The polyolefin production system as recited in claim 1, wherein a second portion of the condensed liquid is delivered as a reflux to the first fractionation column.

5. The polyolefin production system as recited in claim 1, wherein a third portion of the condensed liquid is delivered to a second fractionation column configured to produce substantially olefin-free diluent.

6. The polyolefin production system as recited in claim 3, comprising:
   a diluent vessel disposed between the accumulator vessel and the polymerization reactor, wherein the diluent vessel is configured to receive the first portion of the condensed liquid from the accumulator vessel, wherein the first portion of the condensed liquid is delivered from the diluent vessel to the polymerization reactor.

7. The polyolefin production system as recited in claim 1, wherein the side product stream from the first fractionation column is transported to a diluent vessel.

8. The polyolefin production system as recited in claim 1, wherein the diluent comprises isobutane and the olefin monomer comprises ethylene, and wherein the first fractionation column is configured to operate at a pressure in the range of 125-225 psig (861-1551 kPa) and at a temperature in the range of 100-350° F. (37-176° C.).

9. The polyolefin production system as recited in claim 1, comprising a flash chamber configured to receive an effluent from the polymerization reactor and to discharge a flash overhead stream comprising substantially vapor to the first fractionation column.

10. A method for operating a polyolefin production process, the method comprising the acts of:
    separating diluent from a stream comprising diluent and monomer in a first fractionation column in a fractionation system;
    transmitting the separated diluent to a polymerization reactor;
    separating light components comprising monomer from the stream and at least partially condensing the light components; and
    combining a portion of the condensed light components with the separated diluent being transmitted to the polymerization reactor.

11. The method as recited in claim 10, comprising the act of processing an effluent from the polymerization reactor to generate the stream comprising diluent and monomer.

12. The method as recited in claim 10, wherein the polymerization reactor comprises a polyethylene loop slurry reactor, and the stream comprising diluent and monomer comprises isobutane and ethylene.

13. The method as recited in claim 10, comprising the act of reducing a flow rate of a vent stream comprising monomer from the fractionation system to recover additional monomer within the fractionation system.

14. The method as recited in claim 13, comprising the act of feeding the recovered additional monomer to the polymerization reactor.

15. The method as recited in claim 10, comprising the act of regulating a flow rate of the portion of the condensed light components to avoid upset of operation of the fractionation system.

16. The method as recited in claim 15, comprising the acts of:
  monitoring a concentration of olefin comonomer in an overhead stream of the first fractionation column, wherein the olefin comonomer is heavier than the diluent; and
  regulating the flow rate of the portion of the condensed light components inversely with the concentration of the olefin comonomer in the overhead stream.

17. The method as recited in claim 15, comprising the acts of:
  monitoring a concentration of olefin comonomer in a bottoms stream of a second fractionation column disposed fluidically downstream of the first fractionation column, wherein the olefin comonomer is heavier than the diluent, and wherein the second fractionation column is configured to produce substantially olefin-free diluent in the bottoms stream; and
  regulating the flow rate of the portion of the condensed light components inversely with the concentration of the olefin comonomer in the bottoms stream of the second fractionation column.

18. A process for manufacturing a product comprising a polyolefin, the process comprising the acts of:
  manufacturing a product at least a portion of which comprises a polyolefin, wherein the polyolefin is produced by a method comprising the acts of:
  polymerizing monomer in the presence of catalyst in a polymerization reactor to form the polyolefin;
  processing an effluent from the polymerization reactor to generate a stream comprising diluent and monomer;
  separating diluent from the stream comprising diluent and monomer in a fractionation system;
  transmitting the separated diluent to the polymerization reactor;
  separating light components comprising monomer from the stream comprising diluent and monomer;
  partially condensing the light components; and
  combining a portion of the condensed light components with the separated diluent being transmitted to the polymerization reactor.

19. The process as recited in claim 18, wherein the act of manufacturing comprises the act of processing the polyolefin to form the product or to form a polyolefin component of the product, or a combination thereof.

20. The process as recited in claim 19, wherein the act of processing comprises the act of blending, heating, melting, compounding, extruding, injection molding, precision molding, blow molding, forming a film, forming a coating, or incorporating an additive, or any combination thereof.

21. The process as recited in claim 18, wherein the act of manufacturing comprises the act of assembling a component formed from the polyolefin into the product.

22. The process as recited in claim 18, wherein the polyolefin comprises high density polyethylene (HDPE), medium density polyethylene (MDPE), low density polyethylene (LDPE), linear low density polyethylene (LLDPE), isotactic polypropylene (iPP), or syndiotactic polypropylene (sPP), or any combination thereof.

\* \* \* \* \*

UNITED STATES PATENT AND TRADEMARK OFFICE
CERTIFICATE OF CORRECTION

PATENT NO. : 7,629,421 B2  Page 1 of 1
APPLICATION NO. : 11/313328
DATED : December 8, 2009
INVENTOR(S) : Tait et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Second Day of November, 2010

David J. Kappos
*Director of the United States Patent and Trademark Office*